Jan. 4, 1927.　　　　　　　　　　　　　　　　　1,612,916
A. F. GORTON
CERAMIC ARTICLES AND METHOD OF PRODUCING THEM
Filed April 9, 1925

Inventor
Arthur F. Gorton
by H. A. Pattison
Att'y.

Patented Jan. 4, 1927.

1,612,916

UNITED STATES PATENT OFFICE.

ARTHUR FEDDEMAN GORTON, OF BERWYN, ILLINOIS, ASSIGNOR TO WESTERN ELECTRIC COMPANY, INCORPORATED, OF NEW YORK, N. Y., A CORPORATION OF NEW YORK.

CERAMIC ARTICLES AND METHOD OF PRODUCING THEM.

Application filed April 9, 1925. Serial No. 21,788.

This invention relates to improved ceramic articles and improved methods of producing them.

In the production of articles, such as crucibles and linings therefor it is desirable to employ a comparatively large amount of coarse material which is non-plastic and highly refractory. The reason for this is two-fold. First when the article is formed by molding it is desirable that the shrinkage be reduced to a minimum. This effect can be obtained by using a comparatively small amount of plastic clay as a binder, the remainder being material which has already been fired. The fired material which is employed is also preferably coarse because it has been found in practice that when this material is coarse the article is much less apt to crack when heated or cooled quickly. It is obvious that if the plastic method of forming articles is employed the amount of coarse material used is limited because at least enough plastic material must be retained so that the composition is moldable. Second, if the static slip or casting method is employed the refractory material must be in finely divided form or it will not float or be held in suspension in the slip, but will sink to the bottom thereof. Owing to the difficulties encountered in these two methods of forming crucibles and the like a method sometimes employed has been to mix the highly refractory materials with an organic binder such as tar or molasses, mold the resulting mixture into the desired shape and then fire it in order to remove the organic binder.

Objects of the present invention are to produce an improved ceramic article and to provide an improved method of forming such articles.

In producing an article in accordance with the invention a plaster of Paris mold corresponding to the outside shape of the article to be produced is rotated on a vertical axis and a slip of the desired composition and consistency having a coarse grained relatively heavy material as a constituent is introduced into the mold. Due to the rotation the slip is caused to flow up around the side walls of the mold where sufficient moisture is absorbed by the plaster of Paris to cause a solid precipitation thereon, the coarse grained material being evenly distributed therein.

The invention will be more fully understood from the following detailed description together with the accompanying drawing, in which—

Figure 1:
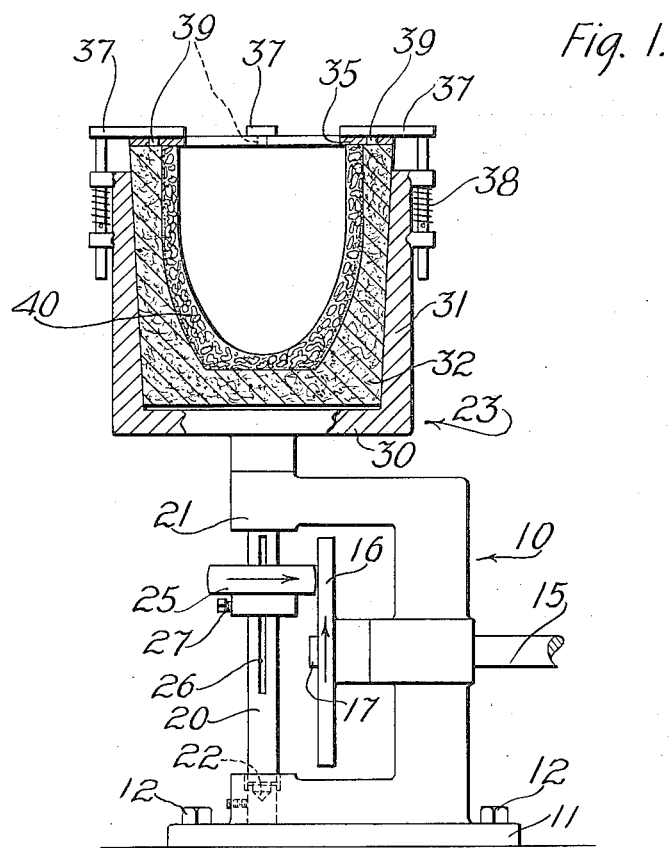
Figure 2:
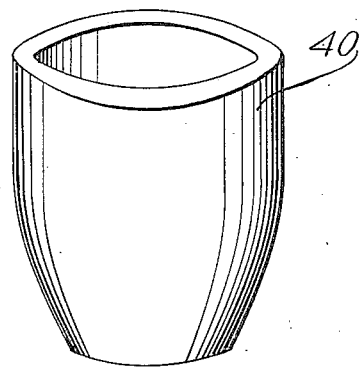

Fig. 1 is an elevation, partially in section, of a mechanism by means of which the invention may be practiced, and Fig. 2 is a perspective view of a finished article embodying the invention.

Referring now to the accompanying drawing which shows apparatus by means of which the method may be practiced, the numeral 10 refers generally to the main frame of a machine and is flared at its lower portion to form a base plate 11 which is secured to any desirable foundation by suitable means such as anchor bolts 12. A shaft 15 leading to a source of power (not shown) is rotatably journaled in a vertical portion of the frame 10 and has secured to one extremity thereof a driving disk 16 which driving disk may be secured to the shaft 15 by suitable means such as a retaining nut 17. A second shaft 20 is rotatably journaled in horizontal portions of the frame 10 at 21 and 22, the shaft 20 having secured to its upper portion a mold-holding member 23. A driven disk 25 is keyed to the shaft 20 in a keyway 26 and is adjustable thereon by means of the elongated character of the keyway. Suitable means such as a set screw 27 is provided for securing the driven disk 25 to the desirable portion of the shaft 20. The sides of the mold-holding member 23 are sloped inwardly so that a mold 32 of absorbent material such as plaster of Paris, placed therein may be easily seated tightly therein, but also be as readily removed when desired. A baffle plate 35 which is designed to prevent a flow of material out of the mold as it is rotated, may be secured to the upper portion of the mold by suitable means such as clamps 37 which may be caused to press tightly against the baffle plate 35 by suitable means such as springs 38, lugs 39 on the clamps 37 being inserted in holes in the baffle plate 35, which may be provided for that purpose. When the mold is revolved the slip including the clay binder and coarse material is driven outwardly against the side walls of the mold and when the moisture has been absorbed the resulting article will take a shape somewhat as shown in the drawing.

In practicing the invention, a mold such as the one shown in the accompanying drawing is suitably rotated on a vertical axis as described above and a suitable quantity of slip inserted therein to obtain a deposit of the thickness desired. The slip which is employed may contain a comparatively small amount of ceramic binder and a large percentage of coarse material, such as carborundum, chrome, zircon, zirconia, silicon carbide, magnesia and the like. The centrifugal force which is caused by the rotation of the mold will cause the coarse material to creep up around the side walls of the mold and as the water is absorbed through the walls thereof the coarse grog and binder will adhere to the lateral surface of the mold, the two materials being distributed evenly.

The region where the greatest deposition of solid material takes place will depend to a large extent upon the speed with which the mold is rotated. If the speed is very great, a large portion of the solid material will be deposited on the lateral surface of the mold and the bottom will be proportionately thin or of substantially the same thickness as the walls. This condition may be very desirable where a refractory lining is being formed for a crucible such as for a graphite crucible which is used in induction furnaces. On the other hand, if the mold is revolved somewhat more slowly a greater amount of coarse material will remain in the bottom thereof and the resulting article will be correspondingly thick in this locality. The latter condition is more desirable where an entire crucible is being cast because a crucible which is somewhat thicker at the bottom possesses greater mechanical strength and will also withstand the corrosion which may take place in the interior thereof, it being well-known that a greater amount of corrosion may occur at the bottom of the crucible than at the top. When producing a crucible of this general character it will be noted that the outer part thereof can take an eccentric shape whereas the interior surface will correspond to a true parabola which is a desirable shape for the interior of such crucibles to possess.

By means of the present method crucibles can be formed of thin cross section which is desirable because crucibles of this character are less apt to crack by subjection to sudden changes in temperature. It is apparent that such a crucible will be less porous than a crucible molded with an organic binder, because the burning out of such a binder necessarily adds to the porosity of the article. A dense crucible is preferable to a porous crucible, particularly in handling molten metals, because a porous crucible will permit metal to enter the pores thereof, and so increase the rate of corrosion.

What is claimed is:

1. A refractory article, centrifugally cast from a slip containing a coarse grained material.

2. A walled article containing a coarse grained material evenly distributed therein, and centrifugally cast from a slip.

3. A walled article cast from a slip which contains uniformly distributed portions of a relatively heavy material, the walled article having a portion of the interior wall thereof of a parabolic shape imparted thereto solely by the rotation of a body of slip during the casting thereof.

4. A method of casting a walled article which consists in rotating at a predetermined speed around an axis a body of slip containing portions of relatively heavy material to cause the slip to assume a predetermined shape with the material uniformly distributed therein, simultaneously therewith removing some of the moisture therefrom to retain the material in its uniform distribution, and thereafter removing the remainder of the moisture.

5. A method of casting a refractory article which consists in rotating a body of slip containing coarse grog, and simultaneously therewith extracting moisture therefrom until the coarse grog is uniformly distributed in the slip and the body thereof becomes self-sustaining.

In witness whereof, I hereunto subscribe my name this 23rd day of March, A. D. 1925.

ARTHUR FEDDEMAN GORTON.